United States Patent

[11] 3,599,207

[72] Inventors Donald L. Foiani
Neptune;
Robert H. Pearce, Lincroft, both of, N.J.
[21] Appl. No. 866,835
[22] Filed Oct. 16, 1969
[45] Patented Aug. 10, 1971
[73] Assignee The United States of America as represented by the Secretary of the Army

[54] COMBINED FREQUENCY MODULATED RADAR AND RADIOMETER
8 Claims, 4 Drawing Figs.

[52] U.S. Cl. .................................. 343/5 R, 343/6 R, 343/100 ME
[51] Int. Cl. .................................. G01s 9/02
[50] Field of Search .......................... 343/5, 6, 100 ME

[56] References Cited
UNITED STATES PATENTS
3,359,555 12/1967 Taylor ............ 343/100 ME (UX)

Primary Examiner—T. H. Tubbesing
Attorneys—Harry M. Saragovitz, Edward J. Kelly, Herbert Berl and Gordon W. Kerr ABSTRACT: This combined radar-radiometer includes a dual-frequency modulated oscillator which functions as the radar transmitter and as the radar and radiometer local oscillator. In one embodiment, one antenna serves to receive both radar and radiometric signals and another antenna transmits the radar signals. In the other embodiment one antenna serves all three functions. The radar and radiometer signals are processed and kept separate in paralleled channels.

The invention described herein may be manufactured, used, and licensed by or for the Government for governmental purposes without the payment to us of any royalty thereon.

COMBINED FREQUENCY MODULATED RADAR AND RADIOMETER

This invention relates to a dual function surveillance instrument and more particularly to such an instrument which combines a passive microwave Dicke-type radiometer with an active radar set for simultaneously observing the same target. The radiometer and the radar outputs of the combined device can be correlated to yield more information than would be obtainable from either instrument separately. Radar involves primarily the measurement of energy backscattered by the target, the echo energy depending on the transmitted power, the target range, the target's radar cross-sectional area, the angle of incidence of the radar beam to the target, the atmospheric attenuation, and several other factors. A radiometer is simply a receiver for measuring the amount of radiation entering the beam of its antenna. In microwave radiometry, the net radiation observed is described as the object's apparent temperature, which is defined as the physical temperature an identical object of unity emissivity would have to possess in order to produce the same microwave radiation intensity. The apparent temperature depends on the target temperature, the target emissivity and the temperature of the environment reflected by the target. Thus, a flat metal plate of high reflectivity and low emissivity which is oriented so that it reflects the sky into the radiometer antenna will indicate approximately the apparent temperature of the sky, which is relatively cold in the microwave and millimeter regions of the spectrum. Radiometric observation of low-reflectivity terrain such as grass or foliage from above will indicate a reading comparable to the terrain temperature which will normally be much warmer than the sky. On the other hand, radar backscatter depends primarily on the amount of the transmitted radar signal reflected. Complex metallic targets containing reflecting corners when viewed from above will generally exhibit both large radar return and high radiometric apparent temperature while nonmetallic objects viewed from the same angle would exhibit smaller radar return and high radiometric apparent temperature. Smooth metal surfaces will show small radar return but low radiometric temperature in general. Thus the use of both instruments will tend to permit separation of metallic targets from all others, since these targets will exhibit either large radar return or low radiometric temperature. For this reason, this invention is particularly useful in detecting concealed manmade metallic objects, and is thus a useful tactical military surveillance device.

The present apparatus is basically a prior art Dicke-type radiometer which has been modified in a novel manner to include a radar capability. The radiometric and radar frequencies are chosen close enough so that common microwave hardware and other circuitry may be used for both the radiometer and radar. In both of the illustrated embodiments of the invention, the radiometer and radar share a common receiving antenna. This feature insures that both instruments are observing exactly the same target. In one of the embodiments only a single antenna is used which functions to transmit the radar signal as well as to receive both signals. Further, in both embodiments the CW radar signal is frequency modulated and the second order sideband of the received echo signal is detected. Further a second audio frequency modulating signal is utilized to periodically vary the number of wavelengths between the antenna and target. This causes the radar received power to periodically vary and means are provided to measure the maximum or peak value of this received power. The invention is illustrated by means of specific frequencies in the millimeter region, however the invention is not limited to these frequencies.

It is thus an object of this invention to provide an improved dual mode surveillance instrument which comprises both a radar set and a microwave radiometer.

Another object is to provide an instrument of the type described which combines a radar set and radiometer in a novel, economical and efficient manner, and which operates in the millimeter region of the spectrum.

A further object of the invention is to combine a radiometer and radar set in such a manner that a maximum number of components are shared while interference between the two sections of the instrument is minimized.

Another object of the invention is to obtain the target identification and discrimination advantages of both a radiometer and radar in a single instrument.

These and other advantages and objects of the invention will become apparent from the following detailed description and drawings, in which.

Figure 1:
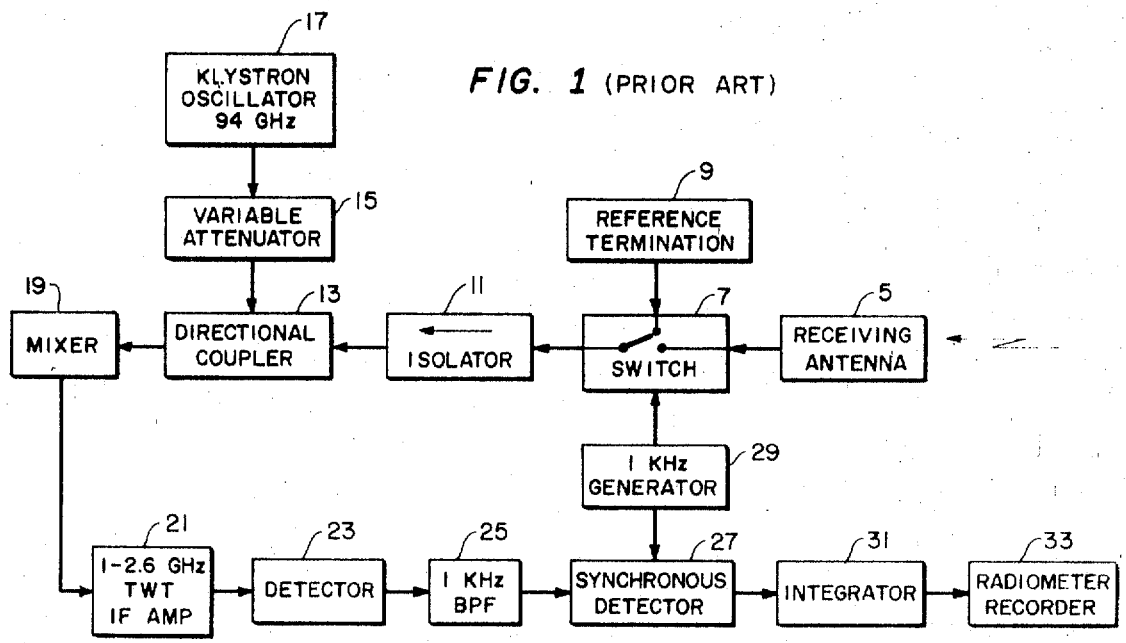
FIG. 1 is a block diagram of a prior art Dicke-type radiometer.
Figure 2:
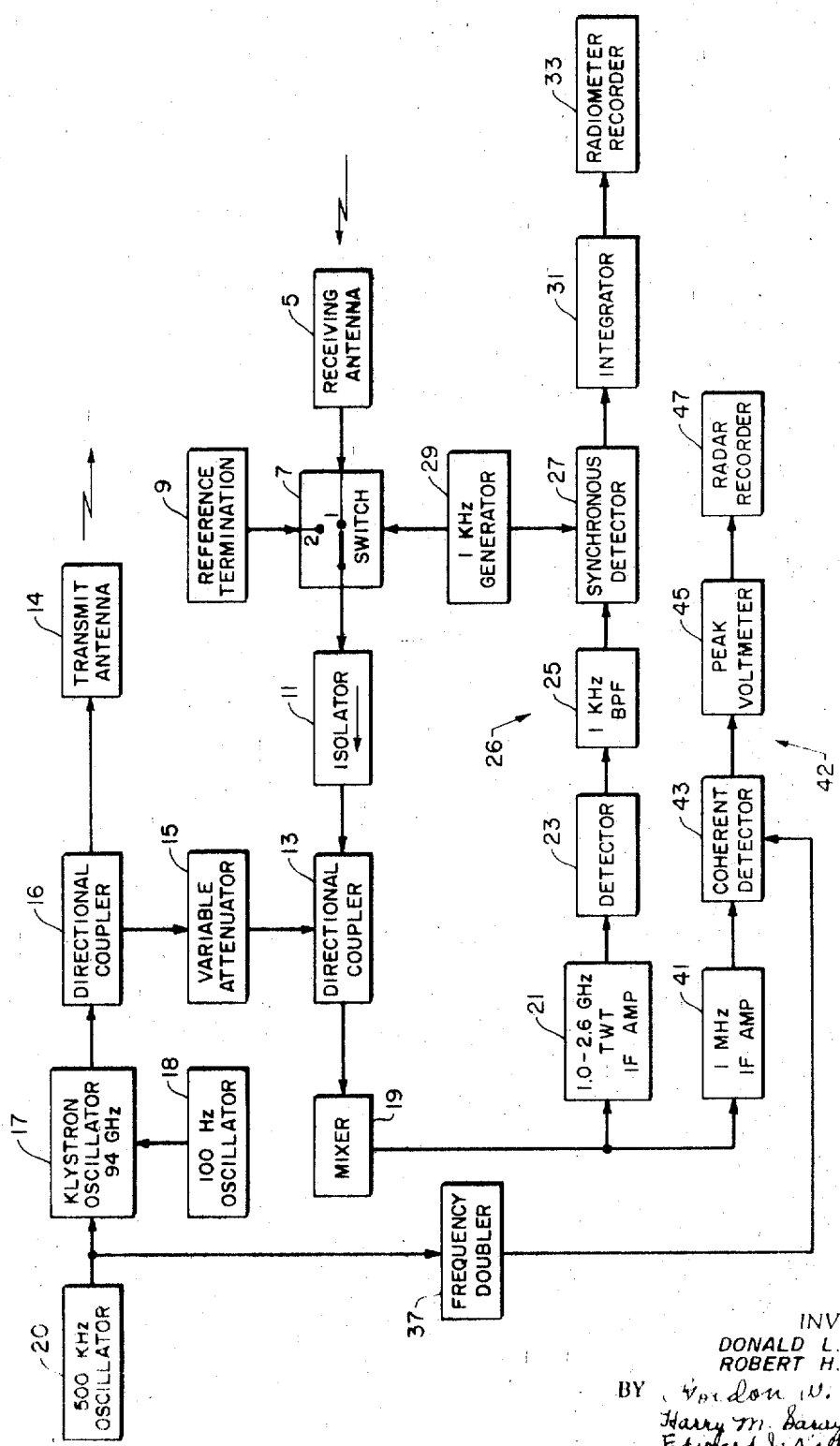
FIG. 2 is a block diagram of an embodiment of the invention utilizing a single receiving antenna for both radar and radiometer signal and a separate radar transmitter antenna.
Figure 3:
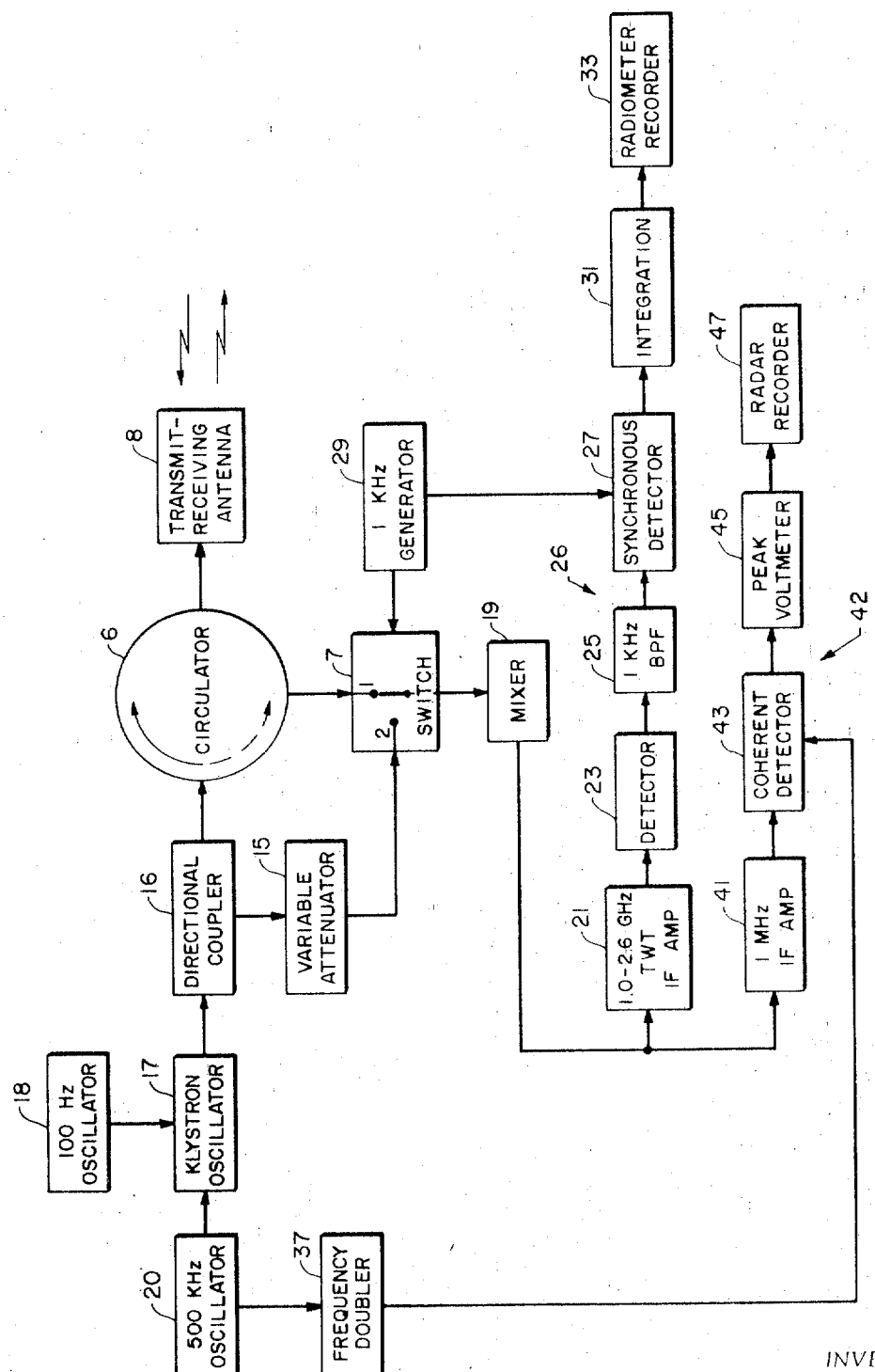
FIG. 3 is an embodiment of the invention in which only a single antenna is needed.

FIG. 1 is a prior art type of Dicke radiometer which is shown for comparison with the combined radiometer-radars of FIGS. 2 and 3 both for comparison and background purposes. The radiometer antenna 5 is directed toward a desired target and will pick up broadband radiation therefrom. It should be recalled that all physical objects above absolute zero radiate electromagnetic energy over the entire spectrum, but the peak energy will shift upward in frequency as the temperature rises. The apparent temperature also depends on the reflectivity and the environment, as is noted above. The radiometer of FIG. 1 simply measures the received microwave energy which is in two frequency bands above and below the frequency of the klystron local oscillator 17. These frequency bands are defined by the tuning and bandwidth of the travelling wave tube intermediate amplifier 21. Amplifier 21 is shown as being tuned to a passband of 1.0 to 2.6 gigaHertz (GHz.). The local oscillator frequency is shown as 94 GHz. Thus any incoming radiation between 95—96.6 GHz. and 91.4— 93 GHz. will be passed by the IF amplifier 21 to the succeeding detection circuitry. The radiometer of FIG. 1 is thus seen to resemble a simple superheterodyne microwave receiver, with the addition of means for comparing the incoming signal to the radiation emitted by a reference termination 9, the temperature of which is known. The ferrite switch 7 alternately connects the receiver to the reference termination 9 and the antenna 5. The switch is driven at 1 kHz. by the generator 29. The purpose of isolator 11 is to prevent local oscillator leakage from being reflected by switch 7 and entering the mixer. In the absence of the isolator, the switch-modulated leakage would cause undesirable radiometer gain fluctuations at the switch frequency, resulting in errors in apparent temperature measurement. The local oscillator signal from klystron 17 and the incoming target or reference signal are applied to the microwave mixer 19 via directional coupler 13. The resultant intermediate frequency signals passed by the amplifier 21 are applied to detector 23. These detected video signals will be amplitude modulated at the frequency of generator 29. The band-pass filter 25 is tuned to the frequency of the switch-operating generator 29. The output of filter 25 is synchronously detected in detector 27, using the switch-operating generator 29 as a reference. The use of the filter 25 and the synchronous detector 27 effectively prevents noise originating in the radiometer itself from reaching the output. The detector 27 is followed by an integrator 31 and a recorder 33. The average value of the voltage output of the detector 27 is proportional to the difference in microwave power received from the reference 9 and the target. The integrator 31 performs the averaging. A radiometer of this type constructed by the present inventors yielded a thermal resolution of 3 centigrade degrees for a 1 second integration time.

The diagram of FIG. 2 shows how the circuit of FIG. 1 may be modified to include a radar capability. Blocks bearing the same reference number perform the same function as those of FIG. 1 and will not be described a second time. Certain of the components of this embodiment now perform dual functions.

For example, the antenna 5 receives both radar and radiometric signals. The oscillator 17 now serves as the radar oscillator as well as the radar and radiometer local oscillator. The mixer 19 also heterodynes both radar and radiometer signals. The radar and radiometer signals are separated in the post-mixer circuitry by means of a pair of paralleled radar and radiometer channels, referenced as 42 and 26 respectively. The directional coupler 16 directs part of the output of oscillator 17 to transmit antenna 14, which is oriented in the same direction as receiving antenna 5. The remainder of the oscillator output passes through attenuator 15 and directional coupler 13 to form a local oscillator signal. The medium frequency (500 kHz. oscillator 20 and the low audio frequency (100 Hz. oscillator 18 are arranged to simultaneously frequency modulate the oscillator 17. The function and circuitry of the radiometer IF and detection channel 26 has already been described in connection with FIG. 1. The radar channel comprises a 1 megahertz IF band-pass filter 41, tuned to twice the frequency of the modulating oscillator 20, coherent detector 43, peak voltmeter 45 and recorder 47, connected in cascade in the recited order. The reference input for the coherent detector 43 comprises a sinusoidal 1 megahertz signal obtained from frequency doubler 37, which doubles the 500 kHz. signal of frequency modulating oscillator 20. In explaining the operation of the radar aspect of this circuit assume that the oscillator 17 is being frequency modulated by the 500 kHz. oscillator only. Both the radar transmitted and echo signals will then be of the usual FM form comprising a carrier plus numerous sidebands spaced by the modulating frequency, $f_m$ (500 kHz). The radar signal at the output of the mixer 19 will comprise, for stationary targets, a DC component plus the fundamental ($f_m$) and higher order sidebands, ($2f_m$, $3f_m$, etc.). In order to minimize the effect of oscillator 17 leakage at zero range and also to discriminate against the radiometer frequencies, the radar IF channel is arranged to pass and detect one of the FM sidebands, in this case the second order sideband ($2f_m$), which is at 1 megahertz with the illustrated frequencies. The second order sideband is selected by filter 41 and coherently detected by detector 43 using the doubled modulating frequency from doubler 37 as a reference. Any of the FM sidebands could have been detected. The echo signal for stationary targets has the same frequency components as the transmitted signal, but is shifted in phase by an amount proportional to target range. Since a mixer is nothing more than a phase detector, the output of the radar channel 42 will vary depending on the number of carrier frequency wavelengths between the antenna and target, as well as with the radar cross section. In order to resolve this ambiguity and produce an output signal which is a function of target range and radar cross section only, the carrier frequency is periodically slowly varied by the low audio frequency oscillator 18. This periodically changes the number of carrier frequency wavelengths between the antenna and target and this causes a corresponding variation in the output of the radar detector 43. The peak value or voltage of this signal is measured by recorder 47. It can be seen that the combined instrument of FIG. 2 utilizes a maximum of common components, operates at rather closely spaced radar and radiometric frequencies with a common klystron, yet effectively separates the two signals by the use of filtering and proper choice of coherent and synchronous detection frequencies. It should be noted that the synchronous detector 27 and the coherent detector 43 actually perform the same function and may comprise identical circuitry; the two synonomous terms were used to avoid confusion between these two elements.

In the embodiment of FIG. 3, the same functions are obtained with a single antenna 8 which transmits the radar signal and receives both radar and radiometric frequencies. The differences between the operation and circuitry of FIGS. 2 and 3 will be explained in detail, the similarities will be apparent from the common circuitry and reference numerals of these embodiments. When the ferrite switch 7 is in the position 1, both the radar echo and radiometric signals are being applied to mixer 19 from common antenna 8 and circulator 6. Thus both received signals travel clockwise around the circulator from the antenna terminal and out to switch contact 1 in the direction of easy circulator energy flow. The radar transmitted signal also passes through circulator 6 in the direction of easy energy flow via directional coupler 16, indicated by the solid-lined arrow. A small amount of leakage flows counter-clockwise around the circulator to provide a local oscillator signal to the mixer in switch position 1, as shown by the dashed arrow. When the switch-operating generator 29 connects contact 2 to the mixer input, a controllable amount of klystron output is applied to the mixer via the directional coupler 16 and variable attenuator 15, to provide a radiometer local oscillator signal. The attenuator 15 is adjusted so that the magnitude of the local oscillator signal applied to the mixer in each switch position is the same. This arrangement eliminates the often troublesome radiometer biasing effect of a local oscillator signal which is modulated by the ferrite switch. No separate reference termination is required in this embodiment, since the variable attenuator 15 provides a source of reference microwave radiation or temperature which is heterodyned in the mixer with the local oscillator signal passed by the same attenuator. The single-antenna version of FIG. 3 also obviates the problem of alignment of two antennas.

Figure 4:
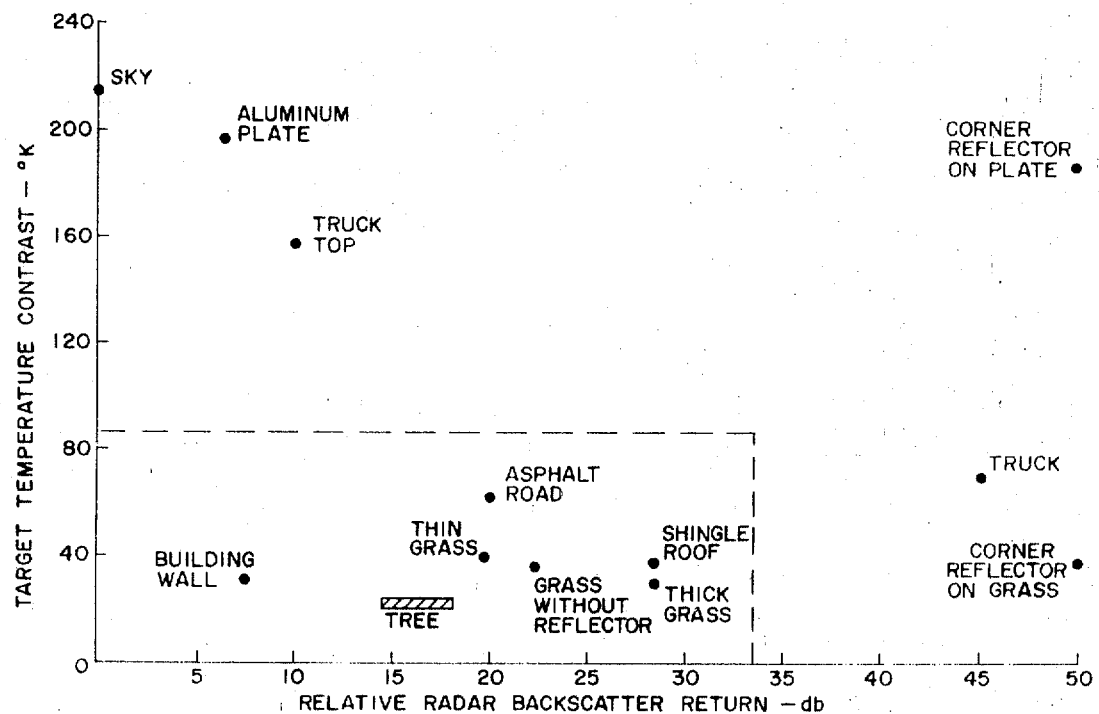
FIG. 4 is a graph showing the radar and radiometric returns or output signals for various types of targets.

The two-antenna version of FIG. 2 was constructed and tested atop a 40 foot tower, while the instrument was observing various targets on the ground below. It should be noted that the radar portion of this instrument does not measure target range, however in many applications this would not be a disadvantage. For example, if the instrument were observing ground targets from an aircraft or satellite, the range could be determined independently from the craft's altitude or orbital data. The targets observed included an aluminum plate, a truck top, the side and roof of a wooden building, a tree, an asphalt road, grass, a truck and a corner reflector. A test was performed to determine if the presence of a large radar echo would affect the radiometer indication. This was done by looking at a large radar target, the corner reflector, placed on a patch of grass. While this target produced an echo signal 50 db. above the radar system noise level, no change in radiometer indication could be measured. FIG. 4 presents a sampling of data to show the advantages of combined radar-radiometer operation. Relative radar return is plotted vs. target apparent temperature contrast in degrees cooler than the reference termination. The greater the radar returns or the greater the contrast, the greater the detectability. The radiometer most readily detects metallic surfaces that are oriented to reflect the cold sky, such as the truck top and the truck. The largest radar returns are from the corner reflector, either on the plate or on the grass. The large return from the target called "truck" on the right side of FIG. 4 is from an intersection formed by the rear of the truck cab and deck, which forms a reflecting "corner".

The most significant conclusion to be drawn from these test results is not the detection ability of either instrument considered separately, but how the use of both might aid in target discrimination. Manmade targets of military importance are usually metallic. These are the targets outside of the dashed area of FIG. 4. Analysis of this figure shows that with a radar or radiometer along there would be ambiguities between metallic and nonmetallic targets. For example, the radar cannot tell the difference between the "truck top," "aluminum plate," or "building wall" as the return from each is about the same. The radiometer cannot distinguish the "truck" from the "asphalt road," since the temperature of each is about the same. The combined use of both instruments however does allow discrimination of all the metallic targets from all other targets, since such targets will generally exhibit large radar return or low radiometric apparent temperature.

While the invention has been described in connection with specific embodiments and frequencies, these are only illustrative and obvious variations in the invention which will occur to those skilled in the art, without departing from the inventive concepts disclosed herein.

What we claim is:

1. A combined radar and radiometer comprising, a frequency-modulated oscillator, a mixer, a transmitting antenna and a receiving antenna, means to direct part of the output of said oscillator to a transmitting antenna and the remainder to said mixer, a switch and a switch-operating generator arranged to alternately connect said receiving antenna and a reference termination to said mixer; radiometer and radar channels connected in parallel to the output of said mixer, said radiometer channel comprising an intermediate frequency amplifier, a detector, a band-pass filter, a synchronous detector, an integrator and a radiometric recorder, all connected in cascade in the order recited, the reference input for said synchronous detector comprising said switch-operating generator; said radar channel comprising an amplifier tuned to the second order sideband of said frequency-modulated oscillator, a coherent detector, a peak voltmeter and a radar recorder, all connected in cascade in the order recited, the reference input for said coherent detector being the second harmonic of the modulation frequency of said frequency-modulated oscillator.

2. The apparatus of claim 1 wherein said band-pass filter in said radiometer channel is tuned to the frequency of said switch-operating generator.

3. The apparatus of claim 1 wherein said frequency modulated oscillator operates in the millimeter wavelength region and wherein the frequency modulation thereof is in the medium frequency range, and further including an audio frequency oscillator for slowly varying the carrier frequency of said frequency modulated oscillator at said audio frequency.

4. A combined radar and radiometer comprising, a frequency-modulated oscillator, a single antenna, a mixer, means to direct part of the output of said oscillator to said antenna via a circulator and the remainder to one terminal of a switch via a variable attenuator, means to direct received radar and radiometric signals to a second terminal of said switch via said circulator; a switch-operating generator connected to said switch; radar and radiometer channels connected in parallel to the output of said mixer, said radiometer channel including an intermediate frequency amplifier, a detector, a band-pass filter, a synchronous detector, an integrator, and a radiometer recorder, all connected in cascade in the order recited, said switch-operating generator being connected to said synchronous detector as the reference signal therefor; said radar channel comprising an amplifier tuned to the second order sideband of said frequency-modulated oscillator, a coherent detector, a peak voltmeter and a radar recorder, all connected in cascade in the order recited, the reference input for said coherent detector being the second harmonic of the modulation frequency of said frequency-modulated oscillator.

5. The apparatus of claim 4 wherein said band-pass filter in said radiometer channel is tuned to the frequency of said switch-operating generator.

6. The apparatus of claim 4 wherein said frequency modulation oscillator operates in the millimeter wavelength region and wherein the frequency modulation thereof is in the medium frequency range, and further including an audio frequency oscillator for slowly varying the carrier frequency of said frequency modulated oscillator at said audio frequency.

7. A combined radar-radiometer surveillance instrument comprising, a frequency-modulated oscillator which functions as the radar transmitter and as the radar and radiometer local oscillator, means to apply the output of said frequency-modulated oscillator to an antenna, antenna means to receive both radar echoes and radiometric signals, means to apply both said radar echoes and radiometric signals to a common mixer, radar and radiometric channels connected to the output of said mixer, said channels separating the radar and radiometric signals by means of filters tuned to different frequencies, said radar channel comprising means to detect any of the sidebands of said frequency-modulated oscillator.

8. The apparatus of claim 7 wherein said last-named means comprises means to detect the second order sideband of said frequency-modulated oscillator.